United States Patent
Kim et al.

(10) Patent No.: US 9,377,892 B2
(45) Date of Patent: Jun. 28, 2016

(54) PORTABLE DEVICE AND METHOD FOR CONTROLLING THE SAME

(71) Applicant: LG ELECTRONICS INC., Seoul (KR)

(72) Inventors: Yongsin Kim, Seoul (KR); Doyoung Lee, Seoul (KR); Hyorim Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 163 days.

(21) Appl. No.: 13/967,009

(22) Filed: Aug. 14, 2013

(65) Prior Publication Data

US 2014/0375596 A1 Dec. 25, 2014

(30) Foreign Application Priority Data

Jun. 20, 2013 (KR) ........................ 10-2013-0070806

(51) Int. Cl.
| | | |
|---|---|---|
| *G06F 3/041* | (2006.01) | |
| *G06F 1/16* | (2006.01) | |
| *G06F 3/0488* | (2013.01) | |
| *G06F 3/14* | (2006.01) | |

(52) U.S. Cl.
CPC ............ *G06F 3/0416* (2013.01); *G06F 1/1641* (2013.01); *G06F 1/1643* (2013.01); *G06F 1/1647* (2013.01); *G06F 1/1652* (2013.01); *G06F 3/04883* (2013.01); *G06F 3/1446* (2013.01); *G06F 2203/04808* (2013.01)

(58) Field of Classification Search
CPC ..... G06F 3/0421; G06F 3/042; G06F 3/0425; G06F 2203/04808; G06F 3/04883; G06F 2203/04806; G06F 1/1643; G06F 2203/04104; G06F 1/1616; G06F 3/016; G06F 3/04845; G06F 3/0488; G06F 1/1626; G06F 1/1641; G06F 1/1647; G06F 3/041; G06F 1/1622; G06F 3/0412; G06F 3/0414; G06F 3/045; G06F 3/1423; G06F 1/1649; G06F 1/1652; G06F 1/181; G06F 3/04886; Y10S 353/03; H04M 1/72519; H04M 2250/16; H04M 2250/22
USPC .............................. 345/1.1–1.2, 3.1, 173–178
See application file for complete search history.

(56) References Cited

U.S. PATENT DOCUMENTS

| | | | |
|---|---|---|---|
| 7,324,093 B1 * | 1/2008 | Gettemy ............... | G06F 1/1622 178/18.01 |
| 8,416,148 B1 | 4/2013 | Park | |

(Continued)

FOREIGN PATENT DOCUMENTS

| | | |
|---|---|---|
| KR | 10-2010-0059585 A | 8/2010 |
| KR | 10-2010-0125934 A | 12/2010 |

*Primary Examiner* — Amare Mengistu
*Assistant Examiner* — Gloryvid Figueroa-Gibson
(74) *Attorney, Agent, or Firm* — Birch, Stewart, Kolasch & Birch, LLP

(57) ABSTRACT

A portable device and a method for controlling the same are discussed. The portable device comprises a double sided display unit including a first display screen on a front side and a second display screen on a back side; a first touch sensor unit and a second touch sensor unit configured to respectively sense a first touch input for the first display screen and a second touch input for the second display screen; and a processor configured to: switch the second touch sensor unit to a ready-to-active state activating temporarily the second touch sensor unit for a predetermined period when the first touch input for the first display screen is sensed, and switch the second touch sensor unit to an active state when the second touch input for the second display screen is sensed within the predetermined period.

21 Claims, 13 Drawing Sheets

(56) References Cited

U.S. PATENT DOCUMENTS

| | | | |
|---|---|---|---|
| 2010/0026656 A1* | 2/2010 | Hotelling | G06F 3/044 345/174 |
| 2010/0117975 A1 | 5/2010 | Cho | |
| 2010/0188353 A1* | 7/2010 | Yoon | G06F 3/04883 345/173 |
| 2010/0295802 A1 | 11/2010 | Lee | |
| 2010/0333006 A1* | 12/2010 | Ostergard | G02B 26/005 715/768 |
| 2011/0199361 A1* | 8/2011 | Shin | G06F 1/1616 345/211 |
| 2015/0011263 A1* | 1/2015 | Itamoto | G06F 3/0488 455/566 |
| 2015/0035770 A1* | 2/2015 | Lee | G06F 3/041 345/173 |

* cited by examiner

FIG. 7
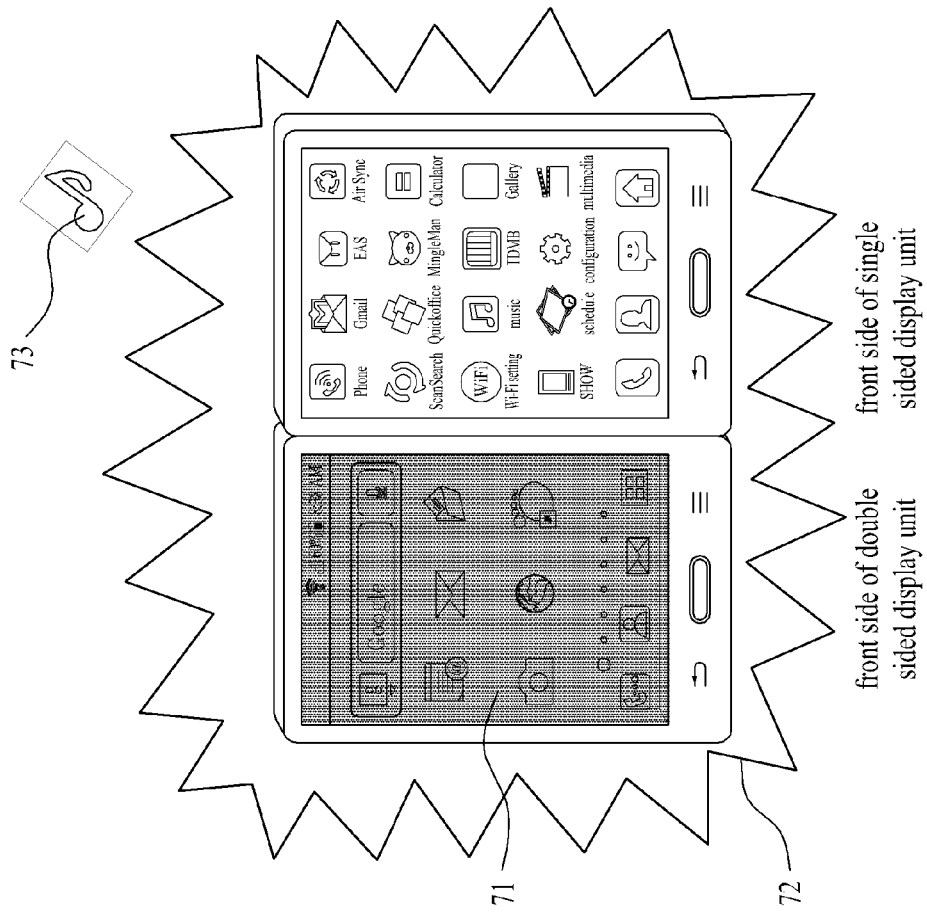
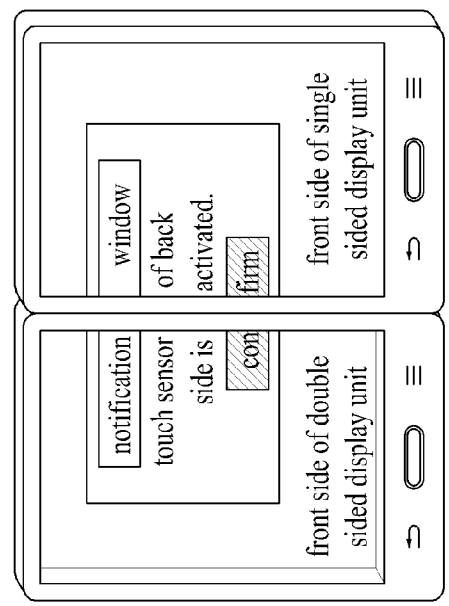

touch sensor of back side in active state

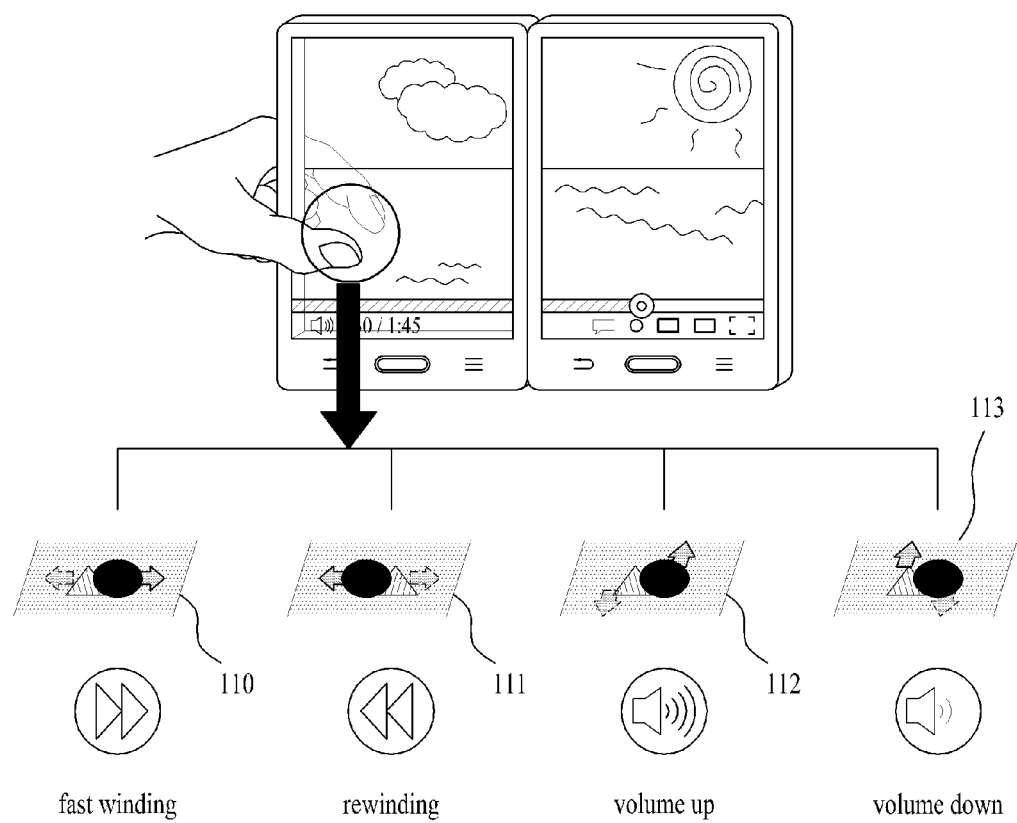

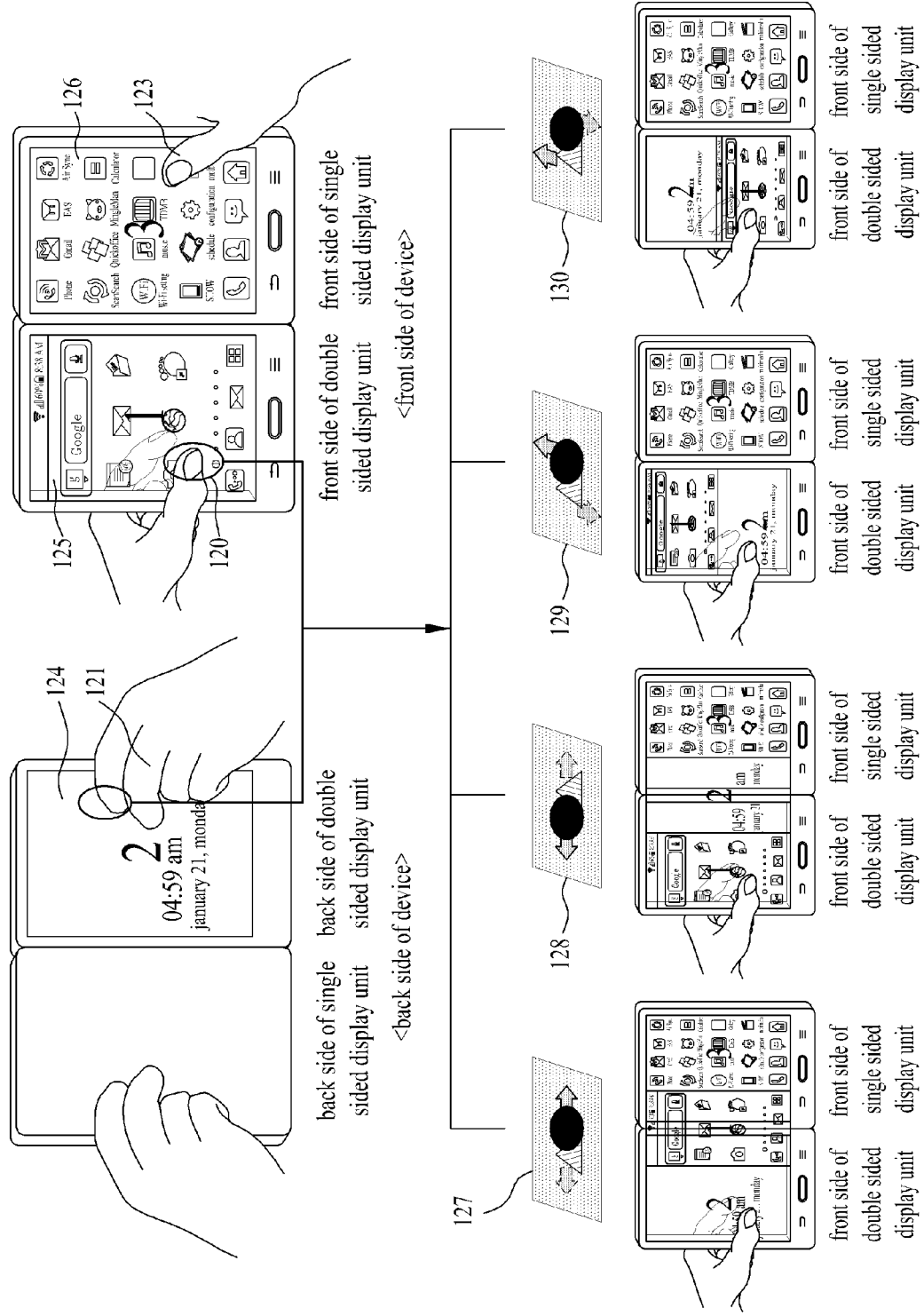

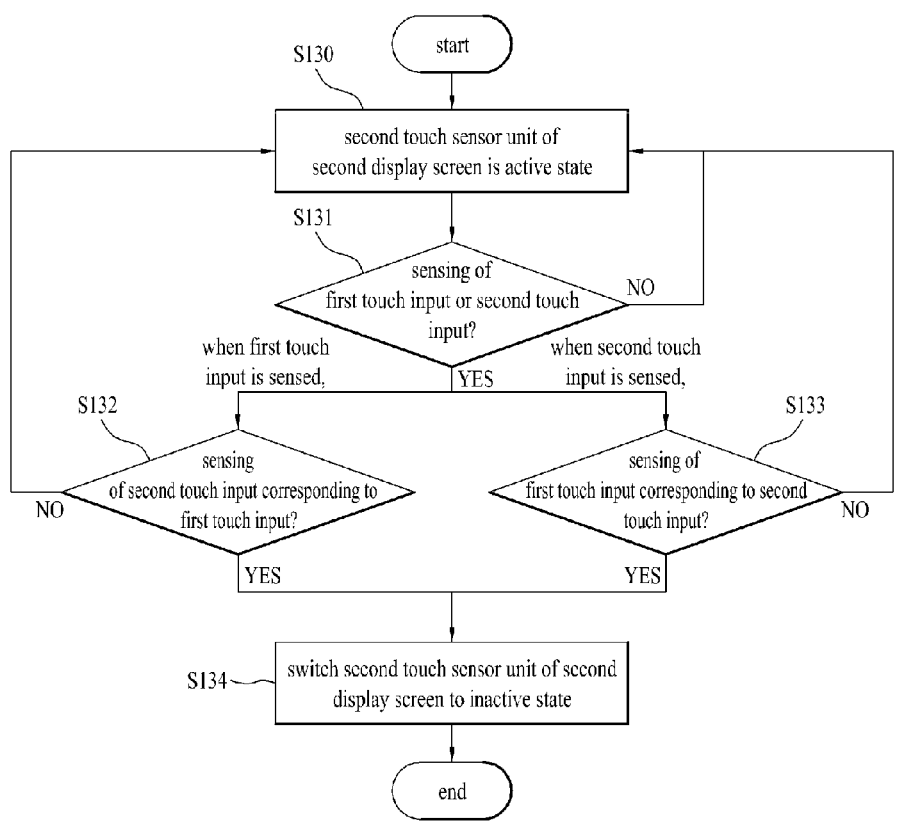

PORTABLE DEVICE AND METHOD FOR CONTROLLING THE SAME

This application claims the benefit of the Korean Patent Application No. 10-2013-0070806, filed on Jun. 20, 2013, which is hereby incorporated by reference as if fully set forth herein.

BACKGROUND OF THE INVENTION

1. Field of the Invention

The present specification relates to a portable device, and more particularly, to a portable device and a method for controlling the same, in which the portable device includes a double sided display.

2. Discussion of the Related Art

With the increase of portable devices, users have used various services, such as interpersonal communication, music listening, web surfing, and electronic financial transaction, by using the portable devices. As services provided through the existing computer are provided by a portable device, users could use the above services regardless of time and place.

However, since the portable device provides a display of a limited size to increase its portability, inconvenience has occurred in using various services. To solve inconvenience, a portable device of a double sided display has been provided with display screens on a front side and a back side, whereby convenience of a user has been improved as compared with the existing portable device. Since the portable device of a double sided display includes two display screens, a method for activating a plurality of display screens will be required. In particular, if the front display screen is in an active state, a method for switching a rear display screen of an inactive state to an active state will be required.

SUMMARY OF THE INVENTION

Accordingly, the present specification is directed to a portable device and a method for controlling the same, which substantially obviate one or more problems due to limitations and disadvantages of the related art.

An object of the present specification is to provide a method for activating sensing of a touch input for a rear display screen and a device for the same.

Another object of the present specification is to provide a method for activating sensing of a touch input for a rear display screen in accordance with a touch input for a front display screen, and a device for the same.

Still another object of the present specification is to provide a method for temporarily activating sensing of a touch input for a rear display screen in accordance with a touch input for a front display screen, and a device for the same.

Further still another object of the present specification is to provide a method for activating sensing of a rear touch input if a touch input for a front display screen and a touch input for a rear display screen corresponding to a point where the touch input for the front display screen is sensed are sensed at the same time, and a device for the same.

Further still another object of the present specification is to provide a method for controlling enlargement or downsizing of an image in accordance with movement of touch inputs for front and rear display screens, and a device for the same.

Further still another object of the present specification is to provide a method for controlling various events in accordance with movement of touch inputs for front and rear display screens, and a device for the same.

Further still another object of the present specification is to provide a method for deactivating sensing of a touch input for a rear display screen in accordance with touch inputs for front and rear display screens, and a device for the same.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a portable device according to the present invention comprises a double sided display unit including a first display screen on a front side and a second display screen on a back side; a first touch sensor unit and a second touch sensor unit configured to respectively sense a first touch input for the first display screen and a second touch input for the second display screen; and a processor configured to control the double sided display unit, the first touch sensor unit and the second touch sensor unit, wherein the processor is further configured to: switch the second touch sensor unit to a ready-to-active state activating temporarily the second touch sensor unit for a predetermined period when the first touch input for the first display screen is sensed, and switch the second touch sensor unit to an active state when the second touch input for the second display screen is sensed within the predetermined period, or switch the second touch sensor unit to an inactive state when a lack of the second touch input is within the predetermined period.

According to one embodiment, since sensing of a touch input for a rear display screen may be activated by a touch input for a front display screen, rear touch sensing may be activated more easily without separate manipulation.

Also, according to another embodiment, since sensing of a touch input for a rear display screen is temporarily activated by a touch input for a front display screen, rear touch sensing is activated continuously, whereby power consumption may be avoided.

Also, according to still another embodiment, since a rear touch sensor is activated in accordance with a rear touch input corresponding to a point where a touch input for a front display screen is sensed, intention of a user who desires to activate a rear touch may be identified more exactly to activate the rear touch sensor.

Also, according to further still another embodiment, if a rear touch is in an active state, enlargement or downsizing of an image is controlled in accordance with mutual action of front and rear touches, whereby an easier zooming control method may be provided.

Also, according to further still another embodiment, if a rear touch is in an active state, various events are controlled in accordance with mutual action of front and rear touches, whereby an easier application control method may be provided.

Also, according to further still another embodiment, rear touch sensing may be deactivated similarly to a method for activating rear touch sensing, whereby a method for deactivating a rear touch more intuitively may be provided.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 7 is a diagram illustrating a portable device that provides a feedback for state switching of a second touch sensor unit in accordance with one embodiment;

FIG. 11 is a diagram illustrating a device in which an event is controlled in accordance with interaction of touch inputs if a moving picture application is implemented in accordance with one embodiment;

FIG. 12 is a diagram illustrating an example of a device in which screen arrangement is controlled in accordance with interaction of touch inputs; and FIG. 13 is a flow chart illustrating state switching from a state of a second touch sensor unit to an inactive state in accordance with one embodiment.

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Although the embodiments will be described in detail with reference to the accompanying drawings and the disclosure described by the drawings, it is to be understood that the present specification is not limited by such embodiments.

With the development of the manufacture technology of electronic devices, portable devices have been miniaturized. This specification relates to a mobile electronic device, which will be referred to as a portable device hereinafter. The portable device means various electronic devices having mobility. For example, the portable device includes electronic devices such as a cellular phone, a personal digital assistant (PDA), a notebook computer, a tablet PC, an MP3 player, a CD player, and a DVD player. Hereinafter, the portable device may be abbreviated as a device.

The portable device may include a plurality of display units. Moreover, the display unit may include a display screen on at least one of a front side and a back side. The display screen may display contents, image and application to provide them to a user. Moreover, the display unit may be provided in the device as combination of a flexible display panel, a hard display panel or display panels which will be described. Various embodiments of a built-in method of the display unit will be described in detail with reference to FIG. 1.

Figure 1:
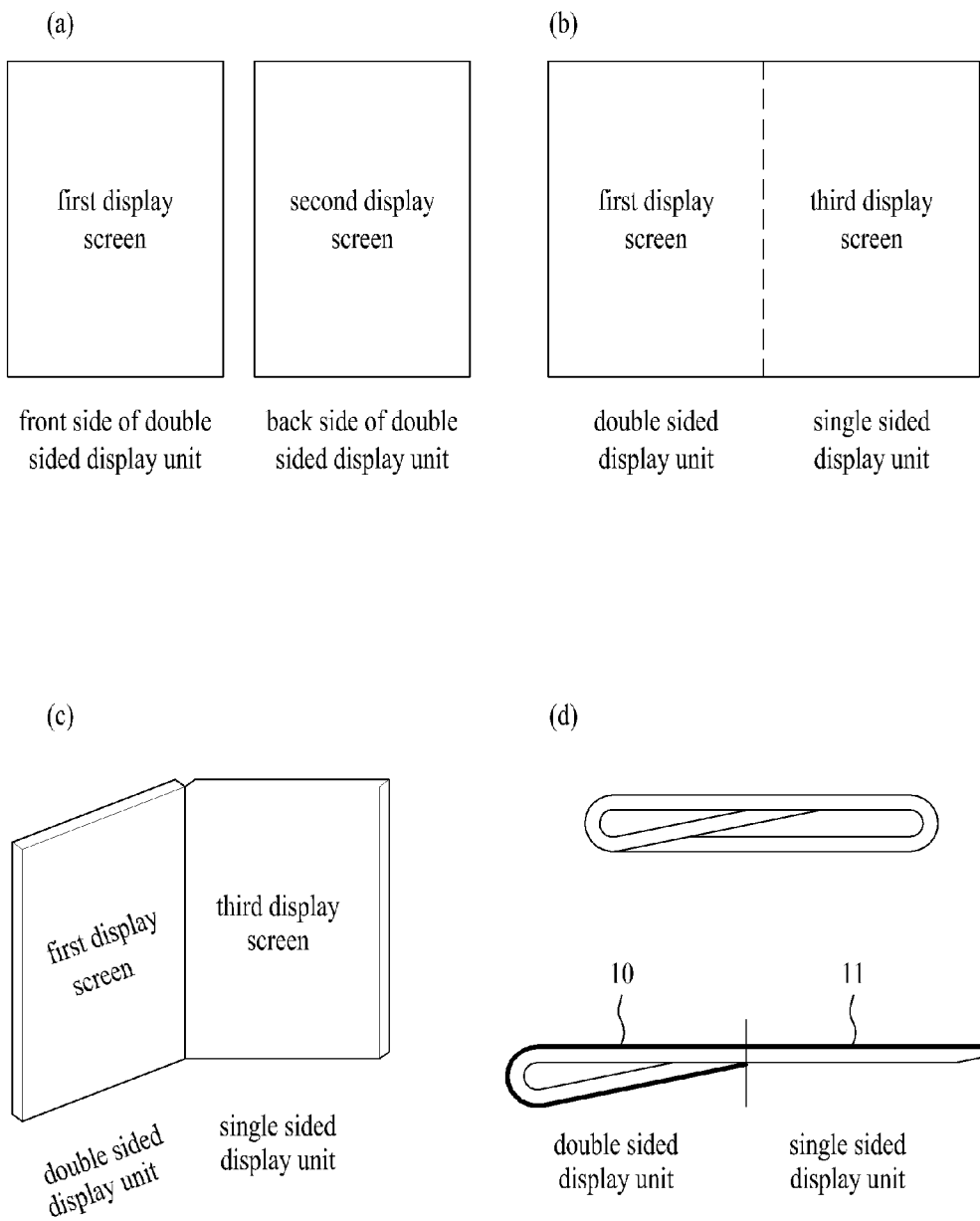
FIG. 1 illustrates various embodiments of a display unit mounted in a device.

FIG. 1 illustrates various embodiments of a display unit mounted in a device.

FIG. 1-(a) illustrates a double sided display unit provided in the device as one embodiment. In this specification, the double sided display unit may mean a unit provided with a display screen at both sides of a display. The double sided display unit may display an image through display screens of both sides, and may sense a touch input of a user for both sides.

In one embodiment, the double sided display unit may include a plurality of hard display panels or one flexible display panel. If the double sided display unit includes one flexible display panel, the flexible display panel is folded or bent to half, whereby it may be provided in the device in a type that a display screen exists at both sides.

Hereinafter, a front side of the double sided display unit will be referred to as a first display screen, and its back side will be referred to as a second display screen. In this case, the front side of the double sided display unit may represent a display screen located in a direction of a user, and the back side may represent a display screen located in a direction opposite to the direction of the user.

FIG. 1-(b) illustrates a double sided display unit and a single sided display unit provided in the device as one embodiment. In particular, FIG. 1-(b) illustrates an example of a device additionally provided with a single sided display unit in addition to the double sided display unit of FIG. 1-(a). In this specification, the device necessarily includes the double sided display unit, and may additionally include the single sided display unit as the case may be.

The single sided display unit may represent a display unit provided with a display screen on one side only. Accordingly, the single sided display unit may sense a touch input for one side or may display an image, unlike the aforementioned double sided display unit. At this time, the display screen provided on one side of the single sided display unit may be referred to as a third display screen. In this embodiment, the display screen of the double sided display unit located on the same side as the third display screen may be referred to as a second display screen. Also, the single sided display unit may include a hard display panel or a flexible display panel.

FIG. 1-(c) illustrates an example of a double sided display unit and a single sided display unit, which include a plurality of hard display panels. The double sided display unit and the single sided display unit may include a plurality of hard display panels. At this time, the device may include a hinge for connecting the single sided display unit with the double sided display unit. In this case, the user may move the locations of the double sided display unit and the single sided display unit on the basis of the hinge if necessary.

FIG. 1-(d) illustrates an example of a double sided display unit and a single sided display unit, which include a flexible display panel. The double sided display unit and the single sided display unit may include at least one flexible display panel. The double sided display unit and the single sided display unit may be divided from each other by folding or bending of the flexible display panel. For example, in a state that the display screen provided in the flexible display panel is located towards the user, the display screen may partially be folded in an opposite direction of the user. At this time, the folded display area and a display area 10 of the front side, which is overlapped with the folded display area, may be referred to as the double sided display unit. Also, a display area 11 except for the double sided display unit may be referred to as a single sided display unit. As far as the display screen is partially folded towards the opposite direction of the user, the number of folding times and the folded point are not limited to the drawing. However, when the flexible display panel is folded to half, as described with reference to FIG. 1-(a), it may be one embodiment of the double sided display unit.

In the meantime, although not shown, the device may include a plurality of double sided display units connected with one another, as one embodiment. At this time, various embodiments of built-in methods of the plurality of double sided display units correspond to the description of FIG. 1-(b) to FIG. 1-(d). Also, in another embodiment, the device may include display screens of different sizes on the front side and the back side. At this time, the display screen area overlapped with the front side and the back side may be referred to as the double sided display unit, and the display screen area which is not overlapped with the front side and the back side may be referred to as the single sided display unit. However, the front display screen may have a size greater than that of the rear display screen. Hereinafter, for convenience of description, the double sided display unit and the single sided display unit will be referred to as the display unit.

Figure 2:
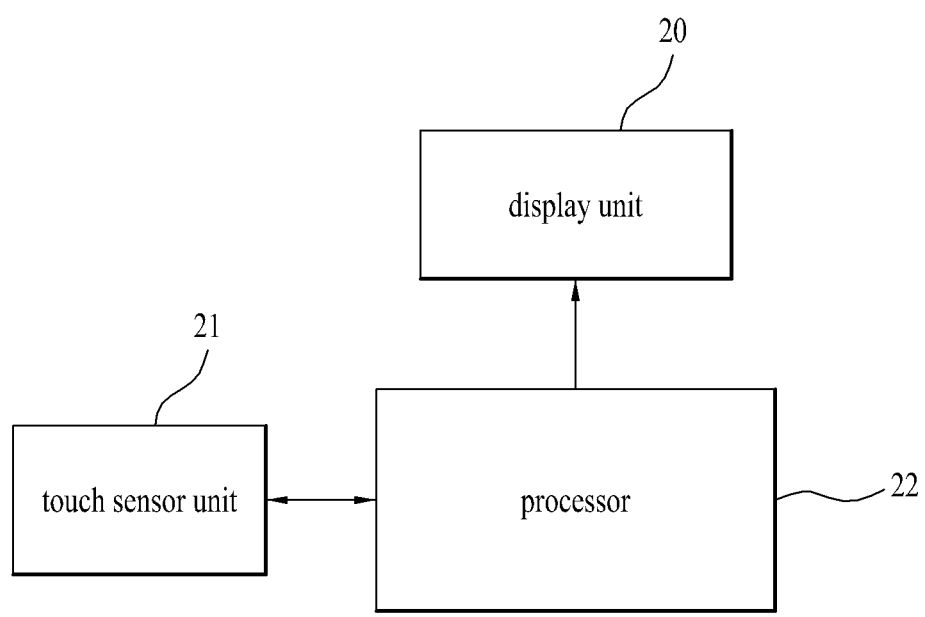
FIG. 2 is a block diagram illustrating a device according to one embodiment.

FIG. 2 is a block diagram illustrating a device according to one embodiment. In FIG. 2, the device may include a display unit 20, a touch sensor unit 21, and a processor 22.

The display unit 20 may output an image through a display screen. In particular, the double sided display unit include display screens at both sides of a display to output the image to both sides. Also, the single sided display unit may include a display screen on one side of the display to output the image to one side. The display unit may be built in the device in various manners as described with reference to FIG. 1.

The display unit 20 may output an image on the basis of contents implemented by the processor 22 or a control command of the processor 22. In this specification, the image may represent still images, moving pictures, and texts, which may be displayed through the display screen, or other various images, which may be expressed visually.

Also, according to one embodiment, the display unit 20 may display an enlarged or downsized image according to a touch input of a user. Moreover, the display unit 20 may display the enlarged or downsized image according to magnification or direction, which is predetermined, through the display screen.

The touch sensor unit 21 may forward a user input or an environment recognized by the device to the processor 22 by using at least one sensor provided in the device. In more detail, the touch sensor unit 21 may sense a touch input of the user for the display screen provided in the display unit 20 by using at least one sensor provided in the device. At this time, the device may include the touch sensor unit 21 in the display screen.

The touch sensor unit 21 may include at least one sensing means. According to one embodiment, the at least one sensing means may include various touch sensing means such as a touch sensor, a fingerprint sensor, a motion sensor, a proximity sensor and a pressure sensor. The touch sensor unit 21 refers to the aforementioned various sensing means, and the aforementioned sensors may be included in the device as separate elements or may be incorporated into at least one element.

In the meantime, the touch sensor unit 21 may sense various touch inputs of contact or non-contact such as a long-press touch input, a short-press touch input, a drag touch input, a release touch input, a hovering input and a flicking touch input. Moreover, the touch sensor unit 21 may sense a touch input based on various touch input tools such as a touch pen and stylus pen and forward the sensed result to the processor 22.

The processor 22 may implement various applications by processing data inside the device. Also, the processor 22 may control contents of the device on the basis of a contents control command. Also, the processor 22 may control each unit of the device, and may control data transmission and reception between the units. Also, if a touch input is sensed through the touch sensor unit 21, the processor 22 may implement a command based on the corresponding touch input. Particularly, in this specification, the processor 22 may activate or inactivate the touch sensor unit 21 of the rear display screen in accordance with the sensed result of the touch input. Hereinafter, for convenience of description, the touch sensor unit of the rear display screen will be referred to as a second touch sensor unit.

The processor 22 may sense a touch input for a specific area by activating a predetermined area of the touch sensor unit. Alternatively, the touch sensor unit 21 may partially forward the sensed touch result to the processor 22, whereby the touch input for the predetermined area may be sensed. Otherwise, the processor 22 may sense the touch input by bypassing or disregarding the sensed result forwarded from the touch sensor unit 21 according to the sensed location.

The processor 22 may control the image displayed on the display screen in accordance with the sensed result of the touch input. In more detail, the processor 22 may control the display unit 20 so that the enlarged or downsized image may be displayed. This will be described in more detail with reference to FIG. 4.

Hereinafter, if each step or operation performed by the portable device starts or is performed by the user input, it is to be understood that the procedure of generating an input signal in accordance with the user input includes the description of the above procedure even without repeated description. Also, it may be expressed that the processor 22 controls the device or at least one unit included in the device in accordance with the user input, and it may be described that the processor 22 may mean the device.

In the meantime, FIG. 2 is a block diagram illustrating a portable device according to one embodiment. In FIG. 2, respective blocks are shown to logically identify the elements of the device. Accordingly, the aforementioned elements of the device may be provided as one chip or a plurality of chips in accordance with design of the device.

Figure 3:
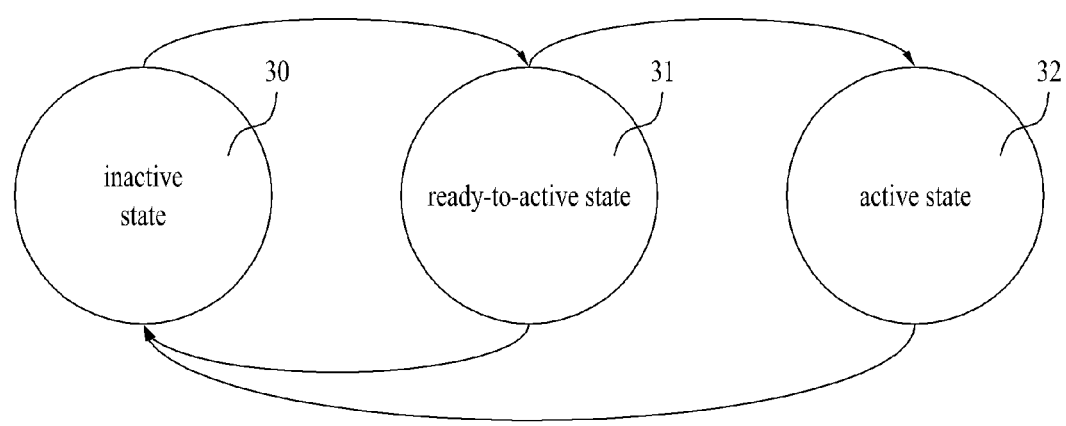
FIG. 3 is a diagram illustrating state switching of a touch sensor unit provided in a second display screen according to one embodiment.

FIG. 3 is a diagram illustrating state switching of a touch sensor unit provided in a second display screen according to one embodiment. In FIG. 3, respective circle nodes represent an inactive state 30, a ready to active state 31, and an active state 32 of the second touch sensor unit, respectively.

The device may switch the state of the second touch sensor unit in accordance with the touch input for the first display screen and the touch input for the second display screen. In other words, the second touch sensor unit may be switched to any one of the inactive state 30, the ready to active state 31 and the active state 32 according to the touch input for each display screen.

When the user is using the first display screen, the second display screen located in an opposite direction of the first display may not be exposed to the user's eye. At this time, if the power is applied to the second display screen, unnecessary power consumption may be generated. Also, when the user grips the device, if the second touch unit is activated, error operation may be caused by an unwanted touch input. Accordingly, in this specification, the device may switch the second touch sensor unit to the ready to active state when the predetermined touch input for the first display screen is sensed. Hereinafter, state switching of the second touch sensor unit based on the touch inputs for the first display screen and the second display screen will be described in detail.

First of all, the inactive state 30 may represent that the second touch sensor unit is deactivated. In more detail, the inactive state 30 may represent that the touch input for the second display screen cannot be sensed as the power is not supplied to the second touch sensor unit. Alternatively, the inactive state 30 may represent that the touch input for the second display screen cannot be sensed as the second touch sensor unit does not forward the sensed result to the processor. Also, the inactive state 30 may represent that the touch input for the second display screen cannot be sensed as the processor bypasses or disregards the touch sensed result forwarded from the touch sensor unit.

The device may switch the second touch sensor unit of the inactive state 30 to the ready to active state 31 in accordance with the touch input for the first display screen. In more detail, if the predetermined touch input for the first display screen is sensed, the device may temporarily activate the second touch sensor unit. Various embodiments of the predetermined touch input for the first display screen will be described in detail with reference to FIG. 5.

Next, the active state 32 may represent the state that the second touch sensor unit is activated. In more detail, the active state 32 may represent the state that the touch input for the second display screen is sensed as the power is applied to the second touch sensor unit. Accordingly, at the active state 32, the device may sense the touch input for the second display screen, and may implement a predetermined command in accordance with the sensed touch input. Moreover, various events may be controlled in accordance with interaction of the touch inputs for the first display screen and the second display screen. This will be described in more detail with reference to FIG. 8 to FIG. 12.

The device may switch the second touch sensor unit of the active state 32 to the inactive state 30 in accordance with multiple touch inputs for the first display screen and the second display screen: In more detail, if the predetermined touch inputs for the first display screen and the second display screen are sensed, the device may deactivate or inactivate the second touch sensor unit. Switching of the second touch sensor unit to the inactive state 30 will be described in more detail with reference to FIG. 13.

Next, the ready to active state 31 may represent the state that the second touch sensor unit is temporarily activated. In more detail, the ready to active state 31 may represent the state that the second touch sensor unit is activated for a predetermined period to temporarily sense the touch input for the second display screen. Moreover, at the ready to active state 31, the device may temporarily activate a part or all parts of the second touch sensor unit in accordance with the embodiment. If the device activates a part of the second touch sensor unit, the device may switch the part of the second touch sensor unit to the active state and switch the other parts to the inactive state 30. Accordingly, the device may sense the touch input only of the predetermined area of the second display screen.

The device may switch the second touch sensor unit of the in ready to active state 31 to the inactive state 30 or the active state 32 in accordance with the touch input for the second display screen. In more detail, if the predetermined touch input for the second display screen is sensed, the device may activate or deactivate the second touch sensor unit in accordance with the corresponding touch input. Various embodiments of the predetermined touch input for the second display screen will be described in detail with reference to FIG. 6.

Figure 4:
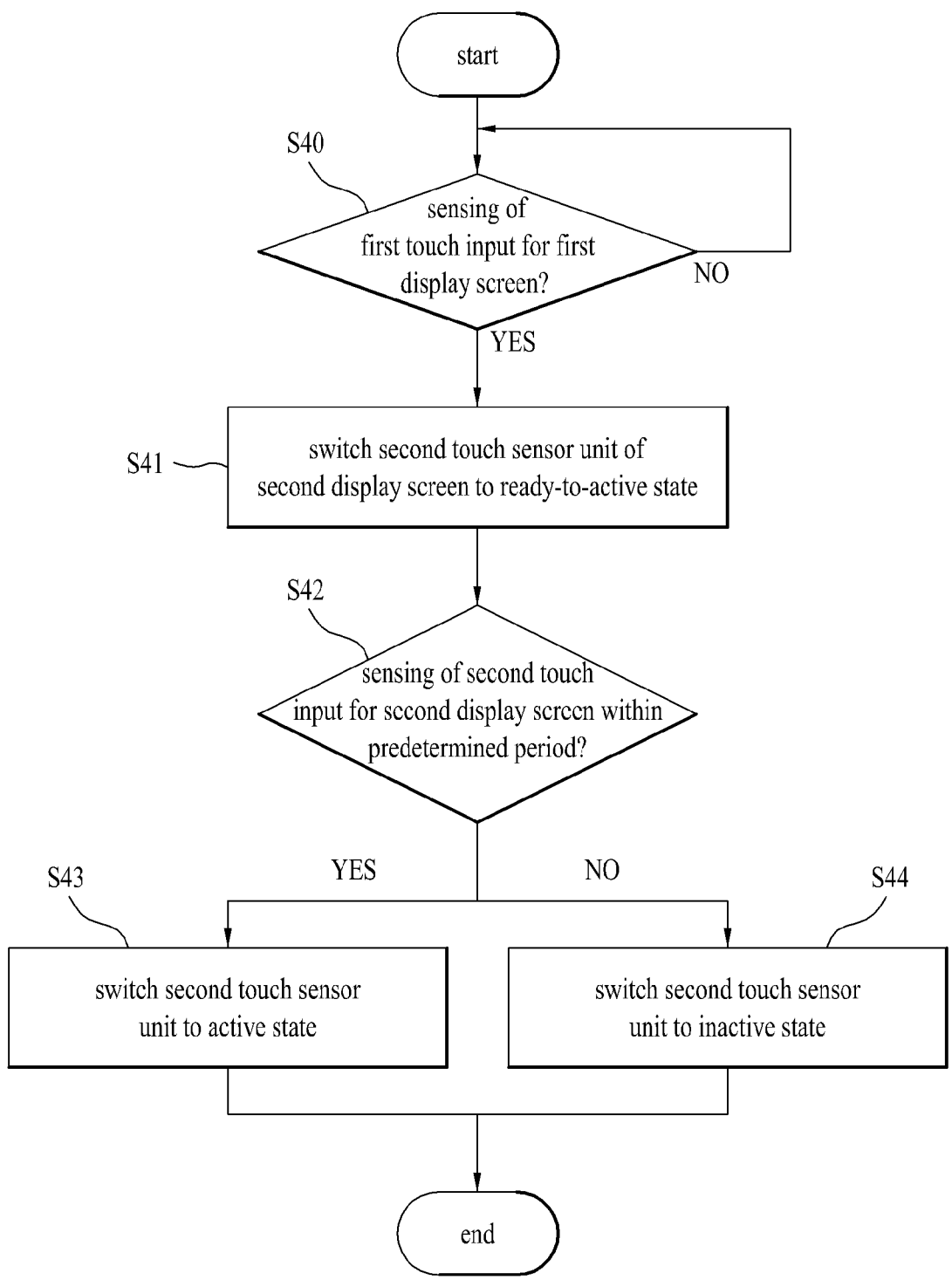
FIG. 4 is a flow chart illustrating state switching of a second touch sensor unit in accordance with one embodiment.

FIG. 4 is a flow chart illustrating state switching of a second touch sensor unit in accordance with one embodiment.

First of all, the device may determine whether a first touch input, which is the touch input for the first display screen, is sensed (S40). In this specification, the first touch input may represent the predetermined touch input for the first display screen. Various embodiments of the first touch input may be made, and will be described in more detail with reference to FIG. 5.

If the first touch input is sensed, the device may switch the second touch sensor unit of the second display screen from the inactive state to the ready to active state (S41). The ready to active state represents that the second touch sensor unit is temporarily activated for the predetermined period. This has been described in more detail with reference to FIG. 3.

If the first touch input is not sensed, the device may return to the step S40 of determining whether the first touch input is sensed. In other words, if a lack of the first touch input is sensed, the device may return to the step (S40) of determining whether the first touch input is sensed.

Next, the device may determine whether a second touch input for the second display screen is sensed at the ready to active state within a predetermined period (S42). In this specification, the second touch input may represent the predetermined touch input for the second display screen. In one embodiment, the second touch input may be set to correspond to the first touch input. In other words, the second touch input may be set to be dependent on the first touch input. For example, the second touch input may be the touch input for a specific point of the second display screen symmetrical to the point where the first touch input is sensed. In another embodiment, the second touch input may be set to be independently from the first touch input. Various embodiments of the second touch input will be described in more detail with reference to FIG. 6.

If the second touch input is sensed within the predetermined period, the device may switch the second touch sensor unit to the active state (S43). The active state may represent the state that the touch input for the second display screen is sensed as the power is applied to the second touch sensor unit. The device may sense the second touch input at the active state of the second touch sensor unit, and may generate various events in accordance with the second touch input. The active state has been described in more detail with reference to FIG. 3.

If the second touch input is not sensed within the predetermined period, the device may switch the second touch sensor unit to the inactive state (S44). The inactive state may represent the state that the touch input for the second display screen cannot be sensed as the power is not applied to the second touch sensor unit. The inactive state has been described in more detail with reference to FIG. 3.

As described above, the device may switch the second touch sensor unit of the second display unit to the ready to active state in accordance with the first touch input for the first display screen. Moreover, the device may switch the second touch sensor unit of the second display unit to the active state or the inactive state in accordance with the second ouch input for the second display screen. Hereinafter, the embodiments of the first touch input and the second touch input will be described in more detail.

Figure 5:
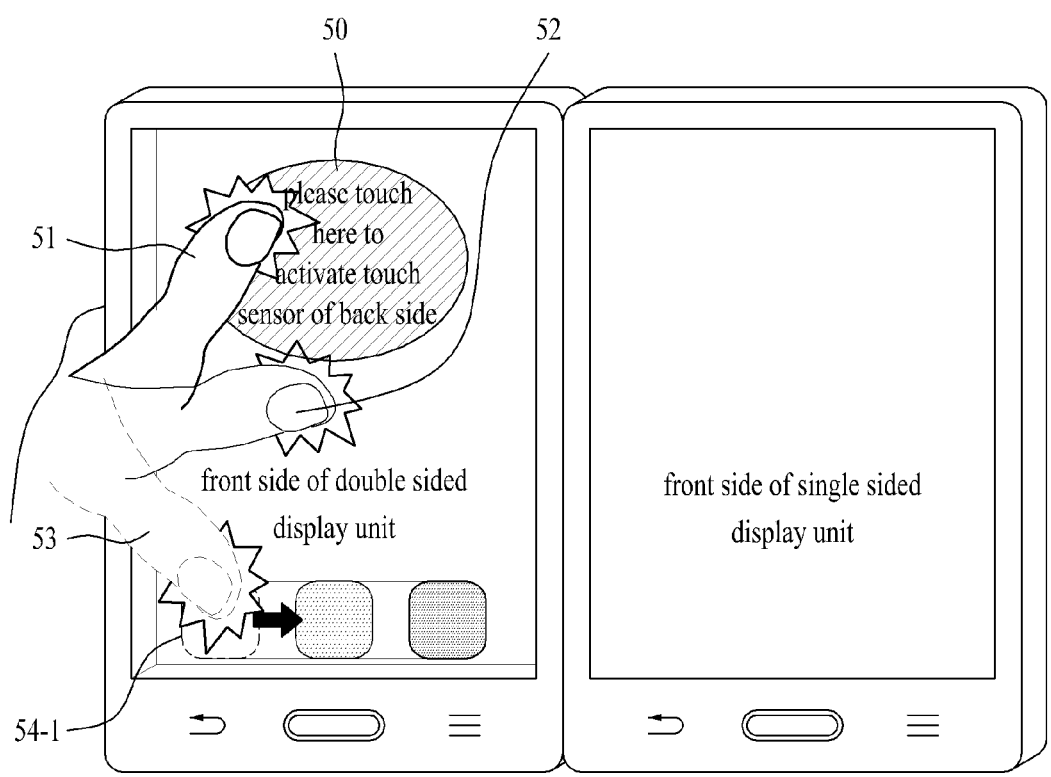
FIG. 5 is a diagram illustrating an example of a first touch input.

FIG. 5 is a diagram illustrating an example of a first touch input. In this specification, the first touch input may represent a predetermined touch input for the first display screen. Alternatively, the first touch input may represent a touch input for switching the second touch sensor unit of the inactive state to the ready to active state. In the meantime, it is assumed that the second touch sensor unit is in the inactive state.

First of all, in one embodiment, the first touch input may be a long-press touch input 52. In this specification, the long-press touch input 52 may represent that a contact for the display screen is maintained for a predetermined period. If the contact for the first display screen is maintained for the predetermined period, the device may switch the second touch sensor unit of the inactive state to the ready to active state. At this time, although not shown, the device may display an indicator indicating a sustain period of the touch input 52 for switching the second touch sensor unit to the ready to active state. For example, the device may indicate the sustain period of the touch input by counting down the predetermined period from the time when the touch input 52 for the second display screen is sensed. At this time, the user may maintain the touch input 52 for the first display screen for the period indicated by the indicator, whereby the second touch sensor unit may be switched to the ready to active state.

In another embodiment, the first touch input 51 may be a touch input for a predetermined point of the first display screen. At this time, the device may display an indicator indicating the predetermined point. In more detail, the device may display the indicator at the predetermined period to allow the user to touch the corresponding point. For example, as shown, the device may display a guide message 50 for activating a rear touch at the predetermined point to allow the user to touch the predetermined point. Also, the device may display a directional image indicating a specific point to guide the first touch input 51. When the touch input for the predetermined point is sensed, that is, when the first touch input 51 is sensed, the device may switch the second touch sensor unit of the inactive state to the ready to active state.

In still another embodiment, the first touch input 53 may be a gesture input for the first display screen. In this specification, the gesture input may represent a touch input for drawing a certain pattern in contact with the display screen. If the gesture input for the first display screen is matched with a predetermined gesture, the device may switch the second display unit of the inactive state to the ready to active state. At this time, the device may display an indicator indicating a pattern patch, to allow the user to input the gesture matched with the predetermined gesture. For example, as shown, the device may display a pattern object 54-1 and a pattern path 54-2 to allow the user to input the gesture matched with the predetermined gesture. If the sensed gesture input 53 is matched with the predetermined gesture, the device may switch the second touch sensor unit of the inactive state to the ready to active state.

In further still another embodiment, the first touch input may a touch input pressed by excess of a predetermined press for the first display screen.

Moreover, the first touch input may be combination of the aforementioned embodiments. For example, the first touch input may be the long-press touch inputs 50 and 51 for the predetermined point. In other words, the first touch input may be the touch inputs 50 and 51 contacted for the predetermined period at the predetermined point. The first touch input is not limited to the aforementioned embodiment, and various modifications may be made in the first touch input in accordance with intention in design of the device, a type of an application which is being implemented, or setting of a user.

Figure 6:
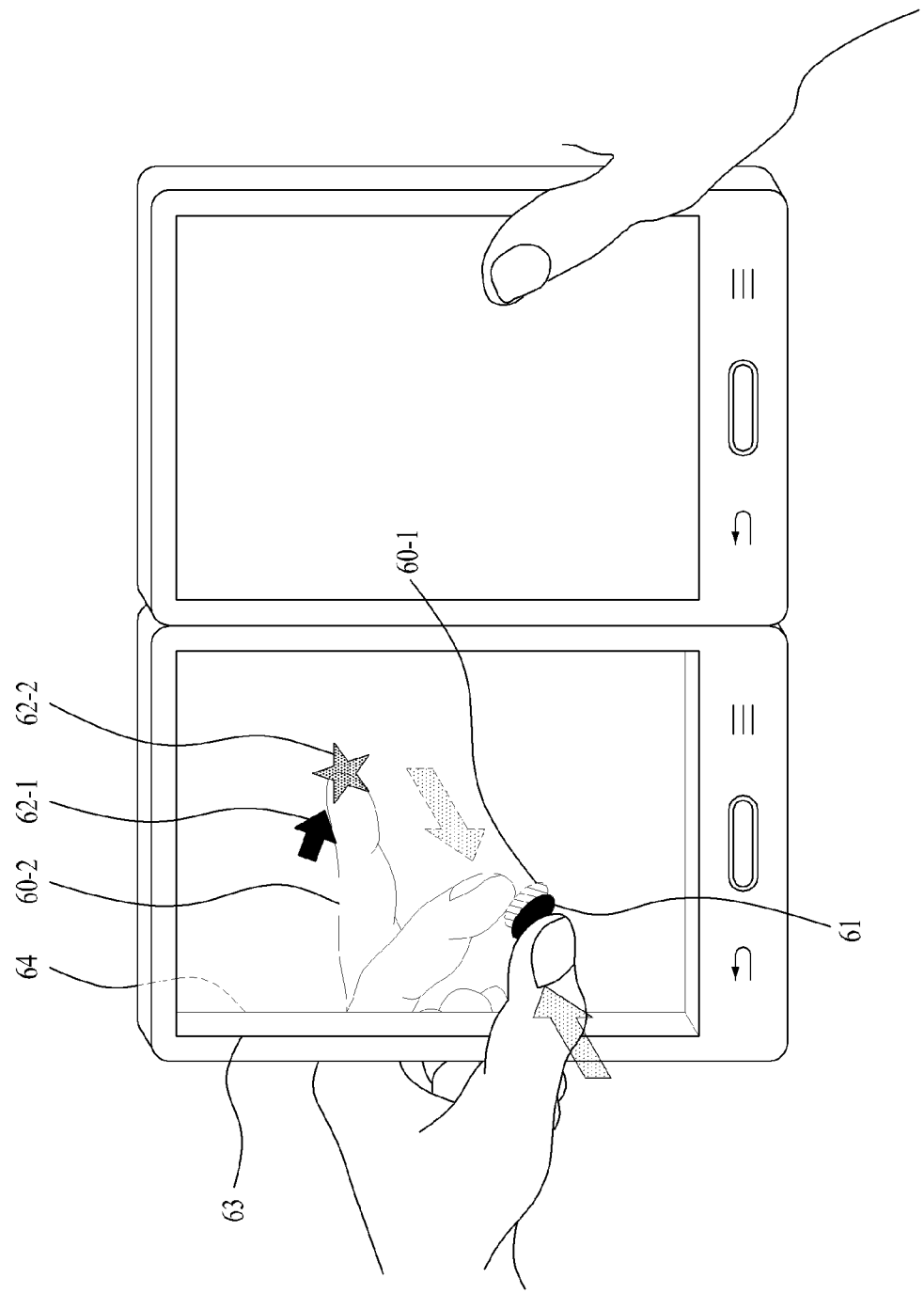
FIG. 6 is a diagram illustrating an example of a second touch input.

As described above, if the device senses the first touch input which is the predetermined touch input, it may switch the second touch sensor unit of the active state to the ready to active state. Moreover, if the device senses the second touch input for the second display screen at the ready to active state of the second touch sensor unit, it may switch the second touch sensor unit to the active state. In FIG. 6, various embodiments of the second touch input for switching the second touch sensor unit to the active state will be described with reference to FIG. 6.

FIG. 6 is a diagram illustrating an example of a second touch input. In this specification, the second touch inputs 60-1 and 60-2 may represent predetermined touch inputs for the second display screen 64. Alternatively, the second touch inputs may represent the touch inputs for switching the second touch sensor unit of the ready to active state to the active state. In the meantime, in this drawing, it is assumed that the second touch sensor unit is in the ready to active state.

First of all, in one embodiment, the second touch input may be the touch input for a specific point of the second display screen 64 symmetrical to the first touch input 61. In more detail, the second touch input 60-1 may represent the touch input for a specific point of the second display screen 64, which is symmetrical to the point where the first touch input 61 is sensed. Alternatively, the second touch input 60-1 may represent the touch input for a specific point of the second display screen 64, which is symmetrical to the point where the first touch input 61 is completed. For example, if the first touch input is the gesture input, the second touch input 60-1 may be the touch input for a point symmetrical to the point where the gesture of the first touch input 61 is completed. Accordingly, in this embodiment, the second touch input 60-1 may be dependent on the first touch input 61.

The user may input the second touch input 60-1 which is the touch input symmetrical to the first touch input 61 subsequently to the first touch input 61 or input the first touch input 61 and the second touch input 60-1 at the same time, whereby the second touch sensor unit may be switched to the active state. For example, as shown, if the user grips the double sided display unit with his/her two fingers for a predetermined period, the device may switch the second touch sensor unit of the ready to active state to the active state.

The device may temporarily activate every area of the second touch sensor unit or a specific area of the second touch sensor unit symmetrical to the first touch input 61 to sense the second touch input. However, in this embodiment, since the device has only to determine whether the touch input is sensed at the point symmetrical to the first touch input 61, it may be favorable to partially activate the corresponding area only in view of power saving.

In another embodiment, the second touch input may represent the touch input 60-2 for the predetermined point of the second display screen 64. The predetermined point of the second display screen 64 may be set in various manners in accordance with a type of an application which is being implemented, design of the device, or setting of a user. The device may guide the second touch input 60-2 by displaying a directional image 62-1 indicating a specific point. For example, the device may indicate a touch point by displaying an arrow 62-1 as an indicator. Alternatively, the device may display indicators 62-1 and 62-2 for indicating the predetermined point. In more detail, the device may guide the second touch input 60-2 by displaying the indicator 62-1 at the specific point of the first display screen 63, which is symmetrical to the predetermined point. Since the second display screen 64 is towards the opposite direction of the user, since it is not exposed to the user's eyes, the device may guide the second touch input 60-2 by displaying the indicator 62-2 on the first display screen 63 exposed to the user's eyes.

At this time, since the second display screen 64 is not exposed to the user's eyes, the user may have a difficulty in performing exact touch input for the predetermined point of the second display screen 64. Accordingly, the device may allow an error of a certain range as the touch input for the predetermined point. In other words, the device may determine the touch input sensed from the corresponding point within a certain error range as the second touch input 60-2, although not the exact touch input for the predetermined point, and switch the second touch sensor unit to the active state.

The device may temporarily activate every area of the second touch sensor unit or the predetermined area of the second touch sensor unit to sense the second touch input 60-2. However, in this embodiment, since the device has only to determine whether the touch input is sensed at the predetermined point of the second display screen 64, it may be favorable to partially activate a specific area including the corresponding point in view of power saving. In the meantime, the specific area may be the area that includes the aforementioned error range.

In another embodiment, the second touch inputs 60-1 and 60-2 may be the touch input for the second display screen 64, which is sensed for the predetermined period or due to excess of pressure. In more detail, the second touch input 60-1 or 60-2 may represent the touch input that contact for the second touch sensor unit is sustained due to excess of the predetermined period. Alternatively, the second touch input 60-1 or 60-2 may represent the touch input sensed as pressure of contact for the second touch sensor unit exceeds predetermined pressure. If the second touch input is sensed, the device may switch the second touch sensor unit to the active state.

Moreover, although not shown, in this embodiment, the device may display an indicator for indicating the predetermined period or the predetermined pressure. For example, the indicator may indicate the corresponding period by counting down the predetermined period from the time when the touch input for the second display screen 64 is sensed. The indicator may be displayed on the first display screen 63 as various graphic user interfaces. At this time, the user may switch the second touch sensor unit to the active state by maintaining contact for the second display screen 64 for the period indicated by the indicator. Also, the user may switch the second touch sensor unit to the active state by maintaining contact with the second display screen 64 in accordance with excess of pressure indicated by the indicator.

FIG. 7 is a diagram illustrating a portable device that provides a feedback for state switching of a second touch sensor unit in accordance with one embodiment.

If the state of the second touch sensor unit is switched, the device may provide a feedback for notifying the user of state switching. In more detail, if the state of the second touch sensor unit is switched, the device may provide at least one of a visual feedback, an auditory feedback, and a tactile feedback.

In one embodiment, if the state of the second touch sensor unit is switched, the device may provide visual feedback. In this embodiment, the visual feedback 70 or 71 may represent that certain notification is provided through vision of the user. The device may provide the visual feedback by displaying a notification image or notification message 70. For example, as shown, the notification message 70 "rear touch is activated" may be displayed to provide the visual feedback 70 or 71 notifying that the second touch sensor unit has been switched to the active state. The notification message 70 may be varied depending on the state of the second touch sensor unit. Also, the device may provide the visual feedback 71 to the user by controlling brightness, illumination, light and shade, contrast, tone, etc. of the display screen. For example, as shown, the device may provide the visual feedback 71 by darkly controlling light and shade of the screen which is being displayed on the first display screen. The modified light and shade of the screen may return to the original state as a certain time passes. Also, the device may provide the visual feedback 70 or 71 by giving various animation effects such as flickering, fade-in and fade-out on the screen which is being displayed on the first display screen. In addition, various embodiments of the visual feedback 70 or 71 exist without limitation to the aforementioned embodiments.

In another embodiment, if the state of the second touch sensor unit is switched, the device may provide an auditory feedback 73. In this embodiment, the auditory feedback 73 may represent that certain notification is provided through auditory sense of the user. The device may provide the auditory feedback 73 by outputting a notification sound, an audio message, etc. For example, if the second touch sensor unit is switched to the active state, the device may output an audio message "touch sensor of back side is activated" to provide the auditory feedback 73 notifying state switching of the second touch sensor.

In addition, in other embodiment, the device may provide a tactile feedback 72. The tactile feedback 72 may include a vibration feedback. The device may output various feedbacks, which stimulate the sense of touch of the user, without limitation to the aforementioned embodiment.

Hereinafter, various embodiments of a method for controlling the device when the second touch sensor unit is in the active state will be described. In other words, the second touch sensor unit of the device, which will be described later, is in the active state, and thus various embodiments will be described on the basis of the device that may sense the second touch input for the second display screen.

Figure 8:
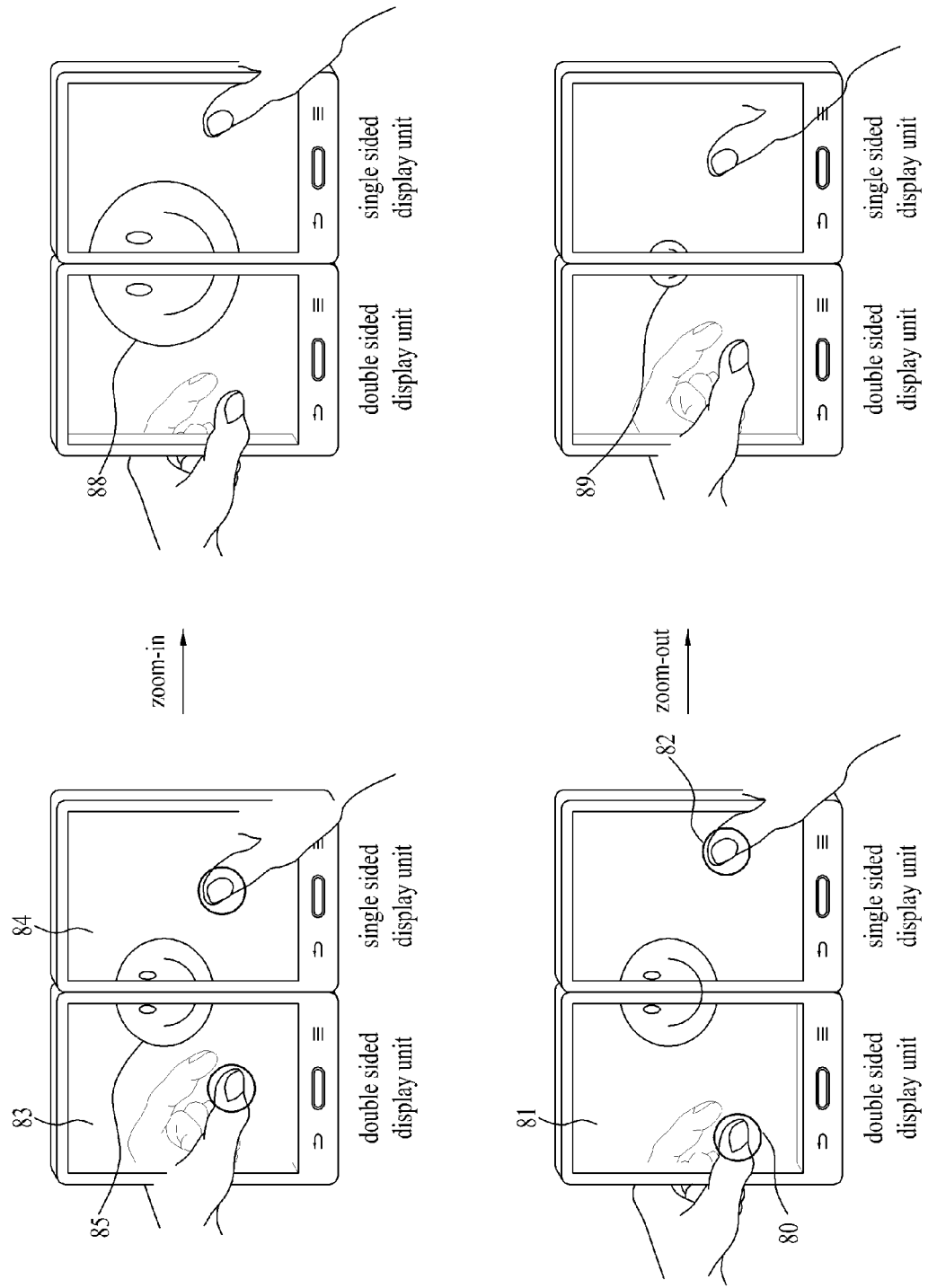
FIG. 8 is a diagram illustrating a device that controls zooming of an image displayed in accordance with interaction of a first touch input and a second touch input according to one embodiment.

FIG. 8 is a diagram illustrating a device that controls zooming of an image displayed in accordance with interaction of a first touch input and a second touch input according to one embodiment.

The device may control zooming of an image in accordance with interaction of the first touch input 80 and the second touch input 82. In this specification, zooming may represent enlargement or downsizing of an image which is displayed. Zooming may be performed in various manners. In this embodiment, zooming may be controlled by interaction of the first touch input 80 and the second touch input 81. In more detail, the device may perform zooming for an image 85 in accordance with a moving direction of the first touch input 80 and the second touch input 81. For example, if the first touch input 80 and the second touch input 82 are moved in a first direction, the device may perform zoom-in 88 for the image 85 which is being displayed on the first display screen 83. Alternatively, if the first touch input 80 and the second touch input 82 are moved in a second direction, the device may perform zoom-out 89 for the image 85 which is being displayed on the first display screen 83. In this case, the first direction or the second direction may be an up, down, left, right or diagonal direction, and may be set in various manners in accordance with design of the device, a type of an application, or user. However, since zoom-in and zoom-out are zooming operations opposite to each other, it may be more intuitive that the first direction and the second direction are set to be opposite to each other. Accordingly, if the first direction is a left direction 86-1, the second direction may be a right direction 87-1 which is an opposite direction of the left direction. In this drawing, the first direction is the left direction 86-1 and the second direction is the right direction 87-1 as one embodiment.

In one embodiment, if movement of the first touch input 80 and the second touch input 81 is sensed, the device may determine a zooming area of the image 85 on the basis of the point where the first touch input 80 and the second touch input 81 are sensed. For example, the device may determine a circle area having a predetermined diameter as a zooming area on the basis of the point where the first touch input 80 and the second touch input 81 are sensed. The zooming area may be determined in various forms on the basis of the first touch input 80 and the second touch input 81 without limitation to the aforementioned embodiment.

If the device provides zooming control in accordance with a multi-touch input for one display screen, zooming magnification may be different from that of the aforementioned embodiment. In other words, zooming magnification based on the first touch input 80 and the second touch input 81 may be different from that based on the multi-touch input for one display screen. For example, if a plurality of touch inputs are sensed on the first display screen 83, and the sensed touch inputs are moved to be far away from one another, the device may perform zoom-in for the image 85. However, at this time, zoom-in magnification may be different from that based on the first touch input 80 and the second touch input 81. For example, if zooming magnification based on the multi-touch input is 'two times', zooming magnification based on the first touch input 80 and the second touch input 81 may be 'four times'. If the same zooming magnification is provided to the multi-touch input for one display screen as well as the first and second touch inputs, since a plurality of control methods for the same zooming control are provided, an inefficient interface may be configured. Also, this could cause confusion for zooming control to the user. Accordingly, to solve this problem, the device may provide a different zooming magnification in accordance with each touch inputs. Both zooming magnification based on the multi-touch input for one display screen and zooming magnification based on the first touch input and the second touch input may be set in various manners in accordance with design of the device, a type of an application, and a user without limitation to the aforementioned embodiment.

In the meantime, the device may additionally include a single sided display unit in accordance with one embodiment. At this time, the device may perform zooming for the image 85 in accordance with a third touch input 82 for a third display screen 84 provided on the front side of the single sided display unit. In more detail, the device may perform zooming for the image 85 in accordance with interaction of the first touch input 80, the second touch input 81 and the third touch input 82. In this embodiment, zooming may be controlled in accordance with a moving direction of the first touch input 80 to the third touch input 82 in the same manner as the embodiment of zooming based on interaction of the first touch input 80 and the second touch input 81. For example, if the first touch input 80 and the second touch input 81 are moved in directions to be far away from the third touch input 82 (86-1 and 86-2), or if the third touch input 82 is moved in a direction to be far away from the first touch input 80 and the second touch input 81 (86-1 and 86-2), the device may perform zoom-in 88 for the image 85 which is being displayed. Alternatively, if the first touch input 80 and the second touch input 81 are moved in directions to be close to the third touch input 82 (87-1 and 87-2), or if the third touch input 82 is moved in a direction to be close to the first touch input 80 and the second touch input 81 (87-1 and 87-2), the device may perform zoom-out 89 for the image 85 which is being displayed. Alternatively, Moreover, even in this embodiment, the device may determine a zooming area of the image on the basis of the point where the first touch input 80, the second touch input 81, and the third touch input 82 are sensed. For example, the device may determine a circle area, which has a distance between the first touch input 80 and the third touch input 82 as a diameter, as a zooming area. The zooming area may be determined in various forms on the basis of the first touch input 80 to the third touch input 82 without limitation to the aforementioned embodiment.

Also, even in this embodiment, if the device controls zooming in accordance with a multi-touch input for the first display screen 83 and/or the third display screen 84, zooming magnification may be different from that of the aforementioned embodiment. In other words, zooming magnification based on the first touch input 80 to the third touch input 82 may be different from that based on the multi-touch input for the first display screen 83 and/or the third display screen 84. If the same zooming magnification is provided to the multi-touch input for the first display screen 83 and/or the third display screen 84 and the first to third touch inputs, since a plurality of control methods for the same zooming control are provided, an inefficient interface may be configured. Both zooming magnification based on the multi-touch input for the first display screen 83 and/or the third display screen 84 and zooming magnification based on the first touch input to the third touch input may be set in various manners in accordance with design of the device, a type of an application, and a user without limitation to the aforementioned embodiment.

Figure 9:
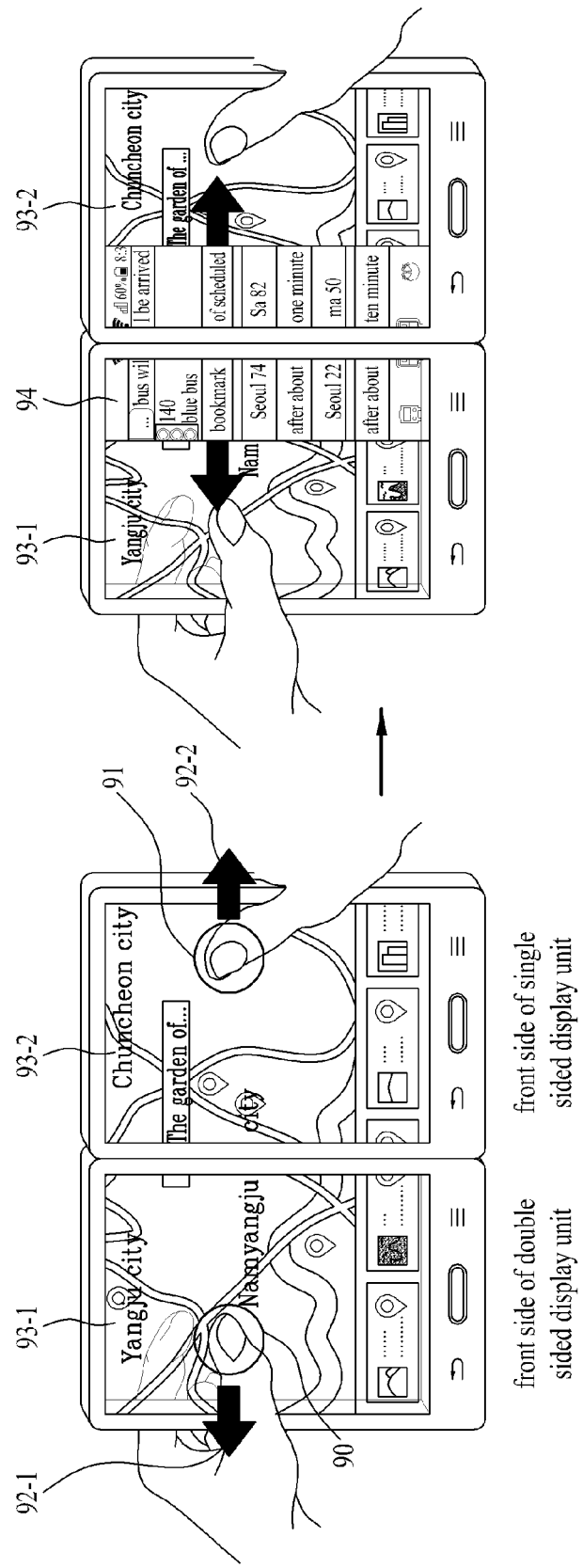
FIG. 9 is a diagram illustrating a portable device that displays a plurality of application implementation screens according to one embodiment.

FIG. 9 is a diagram illustrating a portable device that displays a plurality of application implementation screens according to one embodiment. In this embodiment, the device may include a single sided display unit as an essential element. In this embodiment, the device may provide a multi-tasking function. The multi-tasking function may represent that a plurality of applications are implemented at the same time.

If the plurality of applications is implemented, a respective application implementation screen may be displayed on first to third display screens respectively. If the user uses the first display screen and the third display screen, the second display screen may not be exposed to the user's eyes. Accordingly, in order to view the implementation screen which is being displayed on the second display screen, the user should turn the device such that the display screen is located towards the user. In this way, if the user turns the device, a problem may occur in that it may take a long time or the user may drop the device. Accordingly, in this embodiment, the device may provide the implementation screen 94, which is being displayed on the second display screen, on the first display screen and the third display screen in accordance with interaction of the first touch input 90 to the third touch input 91, whereby the user may not undergo inconvenience that the user should turn the device.

Hereinafter, the implementation screen which is being displayed on the second display screen will be referred to as the second display screen image 94.

If movement 92-1 in a first direction 92-1 of the first touch input 90 and the second touch input is sensed, the device may move the screen 93-1, which is being displayed on the first display screen, to the first direction 92-1. Moreover, if movement 92-1 in a second direction 92-2 of the third touch input 91 is sensed, the device may move the screen 93-2, which is being displayed on the third display screen, to the second direction 92-2. At this time, if the first direction 92-1 is different from the second direction 92-2, a certain margin may occur on the display screen in accordance with the movement. The device may display the second display screen image 94 on the margin. In other words, a background image viewed by movement of the screens may be the second display screen image 94.

For example, the device may display the implementation screen 94 of the application, which indicates a bus arrival time, on the second display screen, and may display implementation screen of a map application on the first display screen and the third display screen. At this time, if movement of the first touch input 90 and the second touch input to the left direction 92-1 and movement of the third touch input 91 to the right direction 92-2 are sensed, the device may respectively move the screens 93-1 and 93-2, which are being displayed on the first and third display screens, in accordance with the sensed movement direction. In other words, the implementation screens 93-1 and 93-2 of the map application may be split into two screens. In accordance with this movement, a certain margin may occur in the center area of the first display screen and the third display screen. The application implementation screen 94, which indicates a bus arrival time, may be displayed on the margin. In this way, the user may identify the second display screen image 94 through interaction of simple touch inputs even without turning the device. As a result, the user may use the multi-tasking function provided by the device more effectively.

Although the second display screen image 94 is displayed on the margin on the display based on the split screen in the drawing, various embodiments such as a home screen, a screen related to an application, which is being displayed on the first and third display, and a configuration screen of the application may be made. Various modifications may be made in the display screen in accordance with design of the device, intention of the device, a type of an application which is being implemented, and the user without limitation to the aforementioned embodiment.

Moreover, if the image is split and moved like this embodiment, the device may provide various animation effects such as split screen. Also, in one embodiment, the device may provide tactile and auditory effects as well as such visual effect.

The user may input interaction of the aforementioned touch inputs subsequently to the first touch input 90 and the second touch input, which are intended to switch the state of the second touch sensor unit. The device may control the image, which is being displayed on the display screen, in accordance with the sensed touch input.

Figure 10:
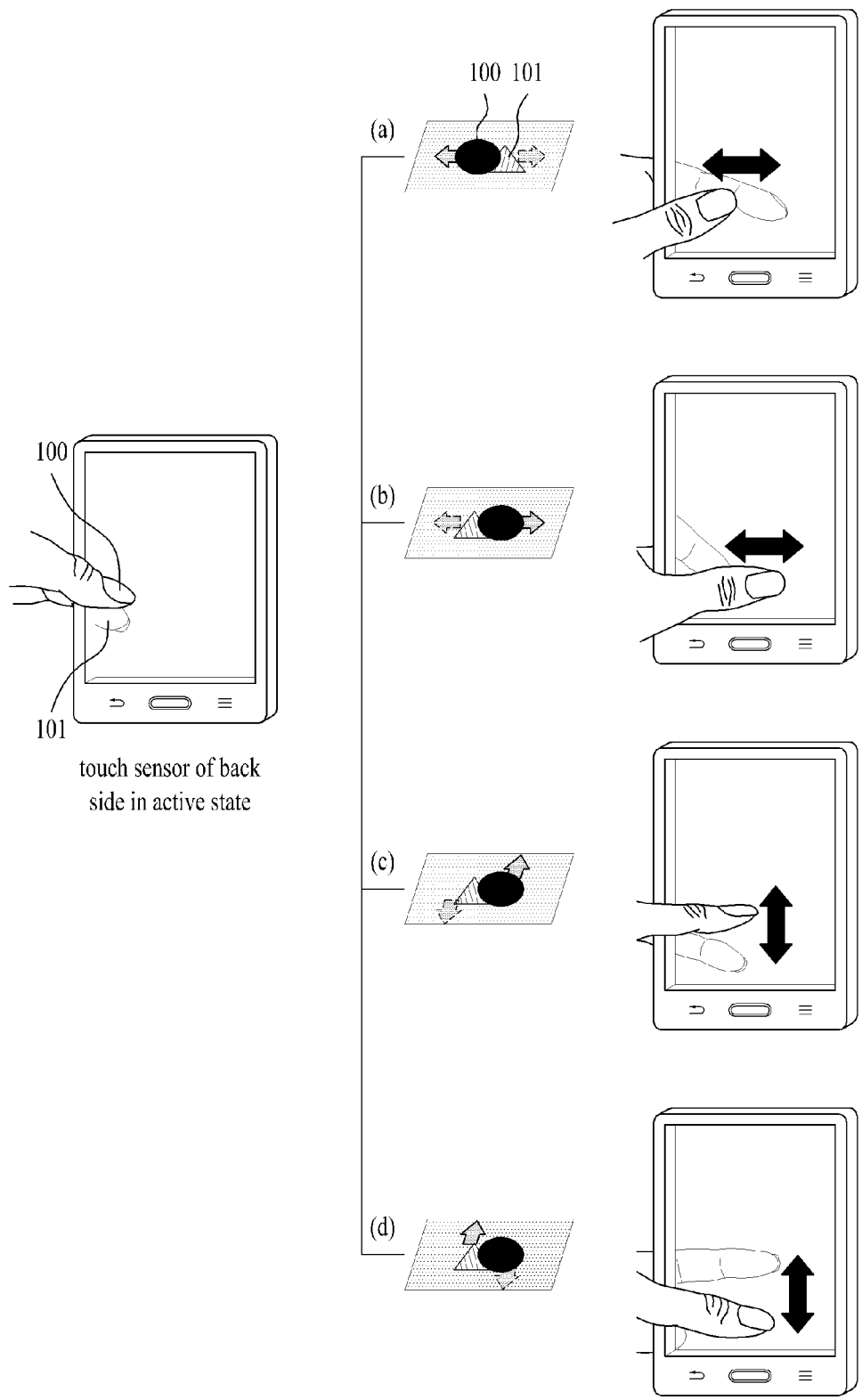
FIG. 10 is a diagram illustrating various examples of a touch gesture for controlling an event of an application.

FIG. 10 is a diagram illustrating various examples of a touch gesture for controlling an event of an application.

The device may switch the second touch sensor unit to the active state in accordance with the first touch input 100 and the second touch input 101. At this time, the device may sense a touch input subsequent to the first touch input 100 and the second touch input 102, and may control an event of an application in accordance with the subsequent touch input.

However, the touch input for controlling the event is not required to be subsequent from the touch input for switching the state of the second touch sensor unit, and may be discontinuous as the case may be.

The first touch input 100 and the second touch input 101 may be the touch inputs sliding to be opposite to each other. For example, if the first touch input 100 is the touch input sliding in a left direction, the second touch input may be the touch input sliding in a right direction. In this embodiment, the opposite direction means a substantial opposite direction, and allows an error of a certain range. The first touch input 100 or the second touch input 101 may be the touch input sliding in various directions such as up, down, left, right and diagonal directions. FIGS. 10-(*a*) and 10-(*b*) illustrate embodiments of the touch input sliding in a right or left direction. Also, FIGS. 10-(*c*) and 10-(*d*) illustrate embodiments of the touch input sliding in a down or up direction.

The device may control various events for an application, which is being currently implemented, in accordance with interaction of the first touch input 100 and the second touch input 101. First of all, a type of the event, which occurs, may be determined in accordance with the type of the application, which is being currently implemented. In other words, the event is not fixed but flexible, whereby an event having high frequency of use from the application, which is being currently implemented, may be matched with interaction of the respective touch inputs. Alternatively, the user may match the type of the event based on touch interaction by using a shortcut key. Accordingly, the device may provide a proper event based on the touch input interaction in accordance with the type of the application, which is being implemented. Alternatively, in another embodiment, the type of the event, which occurs, may be fixed regardless of the type of the application which is being implemented. For example, as shown in FIG. 10-(*a*), if the first touch input 100 is slid in a left direction and the second touch input 101 is slid in a right direction, the device may generate a rotation event of the screen regardless of the type of the application which is being implemented. At this time, the type of the fixed event which occurs in accordance with touch interaction may be set in various manners in accordance with design of the device, intention of the device, and the user.

Moreover, in another embodiment, although not shown, the first touch input 100 and the second touch input 101 moved in a diagonal direction may also exist. Accordingly, the device may control various events.

Hereinafter, in one embodiment, control of the event based on interaction of the touch inputs of FIG. 10 in the device if a moving picture application is being implemented will be described.

FIG. 11 is a diagram illustrating a device in which an event is controlled in accordance with interaction of touch inputs if a moving picture application is implemented in accordance with one embodiment.

As described with reference to FIG. 10, the device may determine the type of the event, which occurs, in accordance with the type of the application which is being implemented. In this embodiment, the device that implements the moving picture application will be described. In case of the moving picture application, 'volume up/down', 'fast winding/rewinding', etc. may be the events the most suitable for properties of the moving picture application. Accordingly, the events such as 'volume up/down' and 'fast winding/rewinding' may be matched with the touch interaction described in FIG. 10. In more detail, if sliding of the first touch input in a right direction and sliding of the second touch input in a left direction are sensed (110), the device may generate the event 'fast winding' for the moving picture which is being played. Also, if sliding of the first touch input in a left direction and sliding of the second touch input in a right direction are sensed (111), the device may generate the event 'rewinding' for the moving picture which is being played. Also, if sliding of the first touch input in an up direction and sliding of the second touch input in a down direction are sensed (112), the device may generate the event 'volume up' for the moving picture which is being played. Also, if sliding of the first touch input in a down direction and sliding of the second touch input in an up direction are sensed (113), the device may generate the event 'volume down' for the moving picture which is being played.

In this way, the device may determine the type of the event in accordance with the type of the application which is being implemented, and may control the determined event in accordance with interaction of the sensed touch inputs. Although the moving picture application is described in this embodiment, various applications may be implemented without limitation to this embodiment. Moreover, in case of the type of the event which occurs, various events, such as zoom-in, zoom-out, rotation of the screen, cancellation of implementation, switching to previous or next object, implementation of previous or next moving picture medium, and display of previous or next image, may exist without limitation to this embodiment.

FIG. 12 is a diagram illustrating an example of a device in which screen arrangement is controlled in accordance with interaction of touch inputs. The need of the user interface that displays the image, which is being displayed on the second display screen, on the first display screen has been described with reference to FIG. 9. Accordingly, in addition to the embodiment of FIG. 9, another embodiment of the user interface that displays the image, which is being displayed on the second display screen, on the first display screen will be described.

In one embodiment, the device may align a plurality of screens in accordance with the touch interaction described in FIG. 10. In more detail, the device may align the plurality of screens in accordance with interaction of the first touch input 120 and the second touch input 121. Although the plurality of home screens are described in this drawing, a plurality of pages or contents having a plurality of images may be aligned by the aforementioned touch interaction without limitation to this embodiment.

First of all, if a first home screen 125 is displayed on the first display screen and a second home screen 124 is displayed on the second display screen, the device may align the plurality of home screens in accordance with interaction of the first touch input 120 and the second touch input 121. In more detail, if sliding of the first touch input 120 in a right direction and sliding of the second touch input 121 in a left direction are sensed (127), the device may align the plurality of home screens in the order of the second home screen 124→the first home screen 125 and display the aligned home screens on the first display screen. Also, if sliding of the first touch input 120 in a left direction and sliding of the second touch input 121 in a right direction are sensed (128), the device may align the plurality of home screens in the order of the first home screen 125→the second home screen 124 and display the aligned home screens on the first display screen. Also, if sliding of the first touch input 120 in an up direction and sliding of the second touch input 121 in a down direction are sensed (129), the device may display the first home screen 125 on the upper side of the first display screen and the second home screen 124 on the lower side of the first display screen. Also, if sliding of the first touch input 120 in a down direction and sliding of the second touch input 121 in an up direction are sensed (130), the device may display the first home screen 125 on the lower side of the first display screen and the second home screen 124 on the upper side of the first display screen. This may provide feeling that the image which is being displayed on each display screen is moved in a state that the image is adhered to a finger of the user. In this way, the screens are aligned in accordance with movement of the touch inputs of the user, whereby the device may provide the user interface which is more intuitive for the screen alignment.

In the meantime, although not shown, the device may switch any one of the plurality of screens to another screen in accordance with touch interaction which is predetermined. For example, if the first and second touch inputs 120 and 121 are slid to be opposite to each other, the device may switch the first home screen 125 of the first display screen to the second home screen 124. Also, the device may switch the second home screen 124 of the second display screen to the first home screen 125.

In the meantime, if the single sided display unit is additionally provided, the device may align a third home screen 126 for the third display screen together with the first and second home screens 124 and 125. For example, if sliding of the first touch input 120 in a left direction and sliding of the second touch input 121 in a right direction are sensed (128), the device may align the plurality of home screens in the order of the first home screen 125→the second home screen 124→the third home screen 126 and display the aligned home screens on the first display screen and the third display screen. FIG. 12 illustrates an embodiment of home screen alignment in the device that additionally includes a single sided display unit.

Also, if the device further includes the third display screen, the plurality of home screens may have a predetermined sequence. For example, the plurality of home screens may have a sequence aligned in the order of the second home screen 124→the first home screen 125→the third home screen 126. In this case, the device may switch the first and third home screens 125 and 126, which are being displayed on the first display screen and the third display screen respectively, to other home screens in accordance with the touch interaction which is predetermined. For example, if sliding of the first touch input 120 in a right direction and sliding of the second touch input 121 in a left direction are sensed (127), the device may switch the first home screen 125 to the second home screen 124 and the third home screen 126 to the first home screen 125. Even in this case, the screens are switched in accordance with movement of the touch inputs of the user for the respective display screens, whereby the device may provide the user interface which is more intuitive for the screen switching.

Moreover, if the first to third home screens 124, 125 and 126 have a circulating sequence, the plurality of home screens may be switched continuously in accordance with the touch interaction which is predetermined. For example, if sliding of the first touch input 120 in a left direction and sliding of the second touch input 121 in a right direction are sensed (128), the device may switch the first home screen 125 to the third home screen 126 and the third home screen to the second home screen 124.

FIG. 13 is a flow chart illustrating state switching a state of a second touch sensor unit to an inactive state in accordance with one embodiment. In this flow chart, a method for switching the second touch sensor unit to the inactive state is similar to the method for switching the second touch sensor unit to the active state as described in FIG. 4. In this embodiment, a method for switching the second touch sensor unit to the inactive state more intuitively and easily will be suggested using the similarity. In the meantime, in this flow chart, detailed description of portions similar to or corresponding to the description of FIG. 4 will be omitted.

First of all, the second touch sensor unit of the second display screen may be the active state (S130). If the second touch sensor unit is in the active state, the device may sense the touch input for the second display screen. The state of the second touch sensor unit has been described in more detail with reference to FIG. 2.

Next, the device may determine whether the first touch input or the second touch input is sensed (S131). In this case, the first touch input may represent the predetermined touch input for the first display screen and the second touch input may represent the predetermined touch input for the second display screen, as described with reference to FIG. 4. In this flow chart, the first touch input or the second touch input may be the touch input of the embodiment described with reference to FIG. 5. Moreover, the device may provide an indicator for indicating the first touch input or the second touch input, and the indicator has been described in more detail with reference to FIG. 5.

If the first touch input or the second touch input is not sensed, the device may maintain the active state of the second touch sensor unit (S130). In other words, if a lack of the first touch input or the second touch sensor unit is sensed, the device may maintain the active state of the second touch sensor unit (S130).

If the first touch input is sensed, the device may determine whether the second touch input corresponding to the first touch input is additionally sensed (S132). Alternatively, if the second touch input is sensed, the device may determine whether the first touch input corresponding to the second touch input is additionally sensed (S133). In this case, the corresponding touch input may include a touch input symmetrical to the first sensed touch input, a long-press touch input, and a touch input for a predetermined area, as described with reference to FIG. 6. Moreover, the device may provide an indicator for indicating the corresponding touch input, as described with reference to FIG. 6.

If the second touch input corresponding to the first touch input or the first touch input corresponding to the second touch input is not sensed additionally, the device may maintain the active state of the second touch sensor unit (S130).

However, if the second touch input corresponding to the first touch input or the first touch input corresponding to the second touch input is sensed additionally, the device may switch the second touch sensor unit of the second display screen to the inactive state (S134). The inactive state of the second touch sensor unit may represent that the touch input for the second display screen cannot be sensed as the power is not supplied to the second touch sensor unit. State switching of the second touch sensor unit has been described in more detail with reference to FIG. 3.

Although the description may be made for each of the drawings, the embodiments of the respective drawings may be incorporated to achieve a new embodiment. A computer readable recording medium where a program for implementing the embodiments is recorded may be designed in accordance with the need of the person skilled in the art within the scope of the present specification.

Also, the device and the method for controlling the same are not limited to the aforementioned embodiments, and all or some of the aforementioned embodiments may selectively be configured in combination so that various modifications may be made in the aforementioned embodiments.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

Also, in this specification, it is to be understood that a width, an area and a length may mean exact values and include a substantial width, area and length of a certain range. In other words, in this specification, movement of touch inputs in the same direction may mean movement in the substantially same direction, and allows an error of a certain range. Also, in this specification, movement of touch inputs in an opposite direction may mean movement in a substantially opposite direction, and allows an error of a certain range.

In this specification, both the product invention and the method invention have been described, and description of both inventions may be made complementally if necessary.

What is claimed is:

1. A portable device comprising:
   a double sided display unit including a first display screen on a front side and a second display screen on a back side;
   a first touch sensor unit configured to sense a first touch input for the first display screen and a second touch sensor unit configured to sense a second touch input for the second display screen; and
   a processor configured to:
   control the double sided display unit, the first touch sensor unit and the second touch sensor unit;
   switch the second touch sensor unit to a ready-to-active state when the first touch input for the first display screen is sensed, the ready-to-active state indicating a temporary sensing state of the second touch input for the second display screen for a predetermined period;
   switch the second touch sensor unit to the active state when the second touch input for the second display screen is sensed within the predetermined period, or switch the second touch sensor unit to an inactive state when a lack of the second touch input is within the predetermined period, the active state indicating a sensing state of the second touch input for the second display screen, and
   switch the second touch sensor unit to the inactive state when the first touch input or the second touch input is sensed at the active state, and the second touch input corresponding to the sensed first touch input or the first touch input corresponding to the sensed second touch input is sensed.

2. The portable device according to claim 1, further comprising a single sided display unit configured to include a third display screen on the front side, the single sided display unit being connected with the double sided display unit so that the first display screen and the third display screen are located on a same side, and
   a third touch sensor unit configured to sense a third touch input for the third display screen,
   wherein the processor is further configured to control the single sided display unit and the third touch sensor unit.

3. The portable device according to claim 2, wherein the processor is further configured to:
   downsize or enlarge an image, which is being displayed on the first display screen and the third display screen, at a first magnification when multiple touch inputs for the first display screen and the third display screen are moved to be close to each other or to be far away from each other, and downsize or enlarge the image at a second magnification when the first touch input and the second touch input are moved to be close to the third touch input for the third display screen or to be far away from the third touch input.

4. The portable device according to claim 2, wherein, when movement of the first touch input and the second touch input in a first direction is sensed and movement of the third touch input for the third display screen in a second direction is sensed, at the active state, the processor is further configured to move a first image, which is being displayed on the first display screen, to the first direction and move a second image, which is being displayed on the third display screen, to the second direction.

5. The portable device according to claim 4, wherein the second direction is an opposite direction of the first direction.

6. The portable device according to claim 4, wherein a background image viewed by movement of the first image or the second image is a home screen image or an application implementation image which is being displayed on the second display screen.

7. The portable device according to claim 2, wherein the double sided display unit and the single sided display unit are configured as at least one flexible display panel.

8. The portable device according to claim 1, wherein the processor is further configured to temporarily activate a predetermined area of the second touch sensor unit for the predetermined period when the second touch sensor unit is switched to the ready-to-active state.

9. The portable device according to claim 8, wherein the predetermined area is determined to correspond to a point where the first touch input is sensed.

10. The portable device according to claim 8, wherein the predetermined area is an overall region or partial region of the second display screen.

11. The portable device according to claim 1, wherein the processor is further configured to switch the second touch sensor unit from the ready-to-active state to the active state when a point where the first touch input is sensed is symmetrical to a point where the second touch input is sensed.

12. The portable device according to claim 1, wherein the processor is further configured to generate a corresponding event at the active state when the first touch input and the second touch input are moved to be opposite to each other.

13. The portable device according to claim 12, wherein the processor is further configured to determine a type of the event according to a type of an application which is being implemented.

14. The portable device according to claim 12, wherein the event includes at least one of volume control, alignment of a plurality of application implementation screens, turning or zooming of an image, and rewinding or fast winding of a moving picture medium.

15. The portable device according to claim 1, wherein when the first touch input and the second touch input are moved in a same direction, the processor is further configured to enlarge or downsize an image, which is being displayed on the first display screen, to correspond to a direction at the active state.

16. The portable device according to claim 15, wherein the processor is further configured to enlarge or downsize the image on a basis of a point where the first touch input and the second touch input are sensed.

17. The portable device according to claim 1, wherein the processor is configured to provide a feedback for notifying switching to the active state when the switching is performed.

18. The portable device according to claim 17, wherein the feedback includes at least one of a vibration feedback, an auditory feedback, a tactile feedback, and a visual feedback.

19. The portable device according to claim 1, wherein the first touch input includes at least one of a touch input sustained by excess of a predetermined period and a touch input sustained by excess of a predetermined pressure.

20. The portable device according to claim 1, wherein the first and second touch sensor units include at least one of a pressure sensor, a touch sensor, and a motion sensor.

21. A method for controlling a portable device, the method comprising:
  determining, via a first touch sensor whether a first touch input for a first display screen of a double sided display unit is sensed, wherein the double sided display unit includes the first display screen on a front side and a second display screen on a back side;
  switching the second display screen to a ready-to-active state when the first touch input for the first display screen is sensed, the ready-to-active state indicating a temporary sensing state of a second touch input for the second display screen for a predetermined period;
  determining, via a second touch sensor, whether the second touch input for the second display screen is sensed;
  switching the second display screen to the active state when the second touch input is sensed within the predetermined period, or inactivating sensing of the second touch input when a lack of the second touch input is sensed within the predetermined period, the active state indicating a sensing state of a second touch input for the second display screen, and
  switching the second display screen to the inactive state when the first touch input or the second touch input is sensed at the active state, and the second touch input corresponding to the sensed first touch input or the first touch input corresponding to the sensed second touch input is sensed.

* * * * *